United States Patent [19]
Thomason

[11] Patent Number: 5,103,802
[45] Date of Patent: Apr. 14, 1992

[54] THERMOSYPHON HEAT-STORAGE AND BACKUP HEAT APPARATUS

[76] Inventor: Harry E. Thomason, 609 Cedar Ave., Fort Washington, Md. 20744

[21] Appl. No.: 737,551

[22] Filed: Jul. 16, 1991

Related U.S. Application Data

[63] Continuation of Ser. No. 871,367, Jun. 6, 1986, abandoned.

[51] Int. Cl.5 .................................................. F24J 2/42
[52] U.S. Cl. .................................. 126/427; 126/428; 126/434; 126/435; 126/437
[58] Field of Search .............. 126/434, 436, 437, 435, 126/432, 427, 428, 417, 419, 452, 450; 237/59, 61

[56] References Cited

U.S. PATENT DOCUMENTS

| | | | |
|---|---|---|---|
| 1,294,517 | 2/1919 | Motley | 237/61 |
| 1,425,174 | 8/1922 | Cartter | 126/434 |
| 1,889,238 | 11/1932 | Clark | 126/434 |
| 2,311,579 | 2/1943 | Scott | 126/437 |
| 2,952,410 | 9/1960 | Mackay | 237/59 |
| 3,610,523 | 10/1971 | Troy | 237/59 |
| 4,000,851 | 1/1977 | Heikmann | 126/437 |
| 4,034,738 | 7/1977 | Barber, Jr. | 126/428 |
| 4,034,912 | 7/1977 | Hayes | 126/427 |
| 4,052,000 | 10/1977 | Honikman | 126/437 |
| 4,052,587 | 10/1977 | Eaton | 237/59 |
| 4,169,461 | 10/1979 | Haug et al. | 126/437 |
| 4,175,698 | 11/1979 | Brozenius | 237/61 |
| 4,253,446 | 3/1981 | Muller | 126/427 |
| 4,285,333 | 8/1981 | Tanaka et al. | 126/437 |
| 4,300,536 | 11/1981 | Taschuk | 237/59 |
| 4,326,499 | 4/1982 | Koskela | 126/435 |
| 4,376,436 | 3/1983 | Tacchi | 126/432 |
| 4,401,100 | 8/1983 | Slater et al. | 126/435 |
| 4,403,602 | 9/1983 | Warden | 126/435 |
| 4,416,222 | 11/1983 | Staats | 237/61 |
| 4,416,256 | 11/1983 | Korwill | 126/437 |
| 4,465,059 | 8/1984 | French | 126/435 |
| 4,479,487 | 10/1984 | Migdol | 126/437 |
| 4,505,262 | 3/1985 | Eaton | 126/434 |

FOREIGN PATENT DOCUMENTS

| | | | |
|---|---|---|---|
| 2505459 | 11/1986 | France | 237/61 |
| 78758 | 9/1918 | Switzerland | 237/61 |
| 1516981 | 7/1978 | United Kingdom | 126/434 |

*Primary Examiner*—Carroll B. Dority

[57] ABSTRACT

Prior inventions in 2-tank solar heat-storage systems, generally speaking, provide for solar-produced heat stored in a first tank. Therefore STORED solar heat is limited to that one tank. Backup heat is produced and stored in a second tank. In the present invention, SOLAR-PRODUCED heat from said first tank flows to said second tank. No pump is used. No pump-control is used. No valve is used. Flow is automatic, by natural thermosyphon action when the temperature in said first tank exceeds the temperature in said second tank. AND, the EFFECTIVE storage of solar-produced heat is much greater. Moreover, heat from said second tank, which usually contains the backup heater(s), does not flow from said second tank back to said first tank. There is no reverse flow and no waste of backup heat energy when the temperature in said second tank exceeds that in said first tank. In order to achieve these desirable results the second tank may be placed at a higher elevation, and the plumbing connections are made so as to automatically transfer the heat one way only. Stratification assures that hot water is on tap, and also assures that solar heat is applied to the coldest water, which can be heated with greatest efficiency of solar heat collection. Also, the hot/warm liquid from stored solar heat and/or the backup heater is used and/or circulated in a unique manner and with apparatus which delivers warm and/or hot water to several points of use at different temperature levels and flow rates.

20 Claims, 1 Drawing Sheet

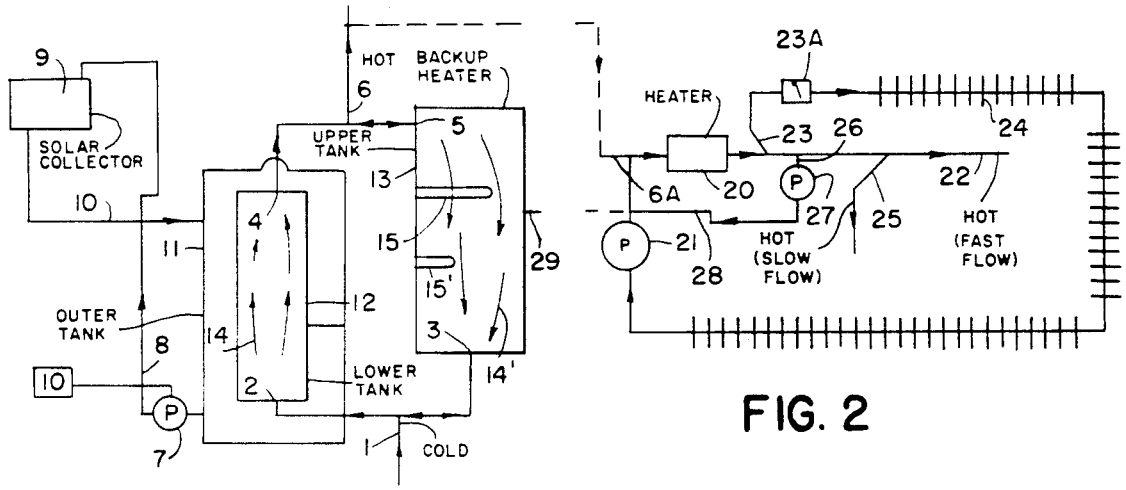
FIG. 1
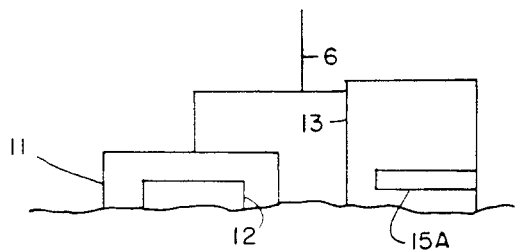
FIG. 2
FIG. 1A
FIG. 1B
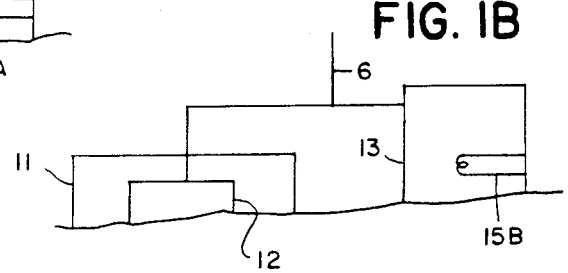
FIG. 1C
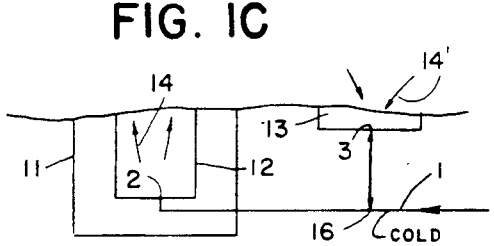
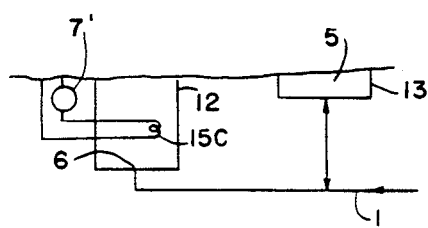
FIG. 1D

THERMOSYPHON HEAT-STORAGE AND BACKUP HEAT APPARATUS

This application is a continuation of application Ser. No. 06/871,367, filed June 6, 1986, now abandoned.

INTRODUCTION

Inventors Harry E. Thomason & Harry Jack Lee Thomason, Jr. have been using solar heat for about 30 years and have had solar domestic water heaters in their solar-heated homes. The type of solar DHW (Domestic Hot Water) system they have used has become known in the art as a 2-tank system. Those systems have performed well but needed improvements, as follows.

The first tank of a 2-tank system stores away solar-heated water for nights and cloudy days and periods of high-usage. But, sometimes that solar-heated water was inadequate. So, a second tank was installed, with a backup heater using electricity, oil or gas to supplement solar heat.

The problems arose due to several factors. One was heat-loss from the backup heater. It was hot all of the time. No insulation is perfect so the backup heat tank loses heat day-and-night, 24 hours per day. That causes the backup heater to come on and waste fuel repeatedly even when no hot water is being used. Worse yet, the backup heater often comes on and wastes fuel even when the solar-heated tank is hot, if no water is being used. Since there is no flow in the system, the solar-heated water remains in the first tank while the backup heater keeps coming ON to keep the second tank hot.

Another problem was excessive waste of backup heat in order to get really hot water for limited uses. The entire backup-heated tank had to be really hot. But, most of the water was used at much lower temperatures. And, that hot tank wastes heat-energy much faster than a warm tank would. So, it was desirable to lower the temperature of the backup heater tank and yet have really hot water available when needed.

Another problem was the lack of sufficient STORED solar-heated water (in both 1-tank systems and 2-tank systems). A single tank of hot water would not last through nights, cloudy days, and periods of high-use. The backup heater in the second tank would be used much of the time.

The California Public Utilities Commission monitored 900 single-family DHW installations and more than 200 multifamily systems and the news was reported: "DHW Systems Get Disappointing Marks". The average household saved only 48% and the average multifamily system provided only 32% savings from solar heat (SOLAR AGE Magazine, January 1986, P. 91).

Inventor Jack Thomason solved some of those problems at his home (known as "SOLARIS" No. 3) by installing a circulating pump, and controls to turn it ON to push hot water from the solar-heated tank to the backup heater tank. It was a big step in the right direction. However, it could be improved on and the present invention teaches how to improve on Jack's solution.

The problem as to how to use the heated liquid most effectively became important to solve. Adding backup heat and recirculating the water or other liquid in accord with certain priorities was needed so that plenty of hot water could be obtained at one point, and hot water at a lower priority at another, and so on.

OBJECTS OF THE INVENTION

It is an object of the invention to reduce the use of backup heat in a solar domestic hot-water heating system.

Another object is to substantially increase the amount of stored solar-heated water without using additional tanks.

Another object is to provide warm water at a predetermined temperature and to provide plenty of hot water at another, higher, temperature.

Another object is to provide first-priority hot water at a high flow rate at one location and lower-priority hot water at another location.

IN THE DRAWINGS

FIG. 1 is a diagram of the solar-heating and heat storage means.

FIGS. 1A, 1B, 1C and 1D are modifications.

FIG. 2 is a diagram of heat-use means.

BRIEF DESCRIPTION

In FIG. 1 two tanks of the so-called 2-tank system are designated as 12 and 13. And, the inner tank 12 is immersed in outer solar-heated tank 11. Thus, when a first heat-producing means, the solar heat collector(s) 9 make the liquid (water) hot in outer tank 11, the water in inner tank 12 also becomes hot.

Tank 12 is designated as the lower tank. Tank 13, the backup-heat tank, is designated as the upper tank. When the water in tank 12 becomes hotter it becomes lighter and flows, by natural convection currents 14, into the top of tank 13. The colder/heavier water in the bottom of tank 13 flows down into the bottom of tank 12 by natural convection currents 14', thus completing the thermosyphon circuit.

But now, when the water in the lower tank becomes cooler and heavier, the lightweight hot water from tank 13 does not flow down into tank 12 where the water is colder and heavier. No valve is used to prevent such unwanted flow. No pump is used to get the water to flow when that is beneficial. No controls are used to turn a pump on-and-off.

It will be noted that BOTH of the tanks (12 and 13) are heated by solar-produced heat. Thus, the quantity of stored solar heat is substantially increased, to last through nights, cloudy days, and periods of high-usage.

FIGS. 1A, 1B, 1C and 1D illustrate modifications of various parts of FIG. 1.

FIG. 2 illustrates a second backup heat-producing means 20 and the best means for utilizing the heat. The water (liquid) can be circulated round-and-round by pump 21 through radiators, baseboard heaters or such to heat a building. And, HOT water can be drawn out from outlet 22 which gets first priority because the plumbing fittings are straight-through with no restriction. Outlets 23 and 25 get second priority because, in order to flow out at 23 and 25, the water must "back-up" at the Y fitting(s), installed as illustrated. The flow could be otherwise restricted more or less to yield first priority to outlet 22 and second, third, etc. priority at outlets 23 and 25.

DETAILED DESCRIPTION AND OPERATION

Cold water to be heated flows into the system at 1, 2 and 3 and heated water flows out at 4, 5 and 6 in one loop. Pump 7 sends water in another loop through conduit 8 to solar collector(s) 9 and back through conduit 10 to an OUTER tank 11.

The water in LOWER tank 12 is warmed as it is bathed in the solar-heated water in tank 11. Then, the water in UPPER tank 13 is heated by convection currents of warm water 14 flowing up through lower tank 12. During the periods of convection-current heat transfer, currents 14' descend through tank 13. A first backup heat-producing means 15 comes ON, if needed, to heat the water even more in tank 13. A third backup heat-producing means 15' may be used if desired.

FIG. 1A illustrates a gas or oil-fired flame in firebox 15A, instead of an electric heater, to supply backup heat.

FIG. 1B illustrates a heat-exchanger 15B, supplied with heat from a furnace or such, to supply backup heat to tank 13.

FIG. 1C illustrates cold water coming in at 1 being introduced to the loop through a Tee or jet 16. Such Tee or jet gives a boost to the natural convection currents 14 and 14' while water is being introduced at 1, 2 and 3 and being drawn out at 4, 5 and 6.

FIG. 1D illustrates a heat exchanger 15C inside of lower tank 12. Pump 7' is used to circulate liquid to be heated to the solar collector 9. In this modification, outer tank 11 is not required.

A. The solar heat collector pump 7 comes ON and pushes cold water to be heated from the bottom of the outer tank 11 up through supply pipe 8 to the solar collector(s) 9 and solar-heated water flows back through pipe 10 to the top of tank 11. The water in outer tank 11 becomes hot, that bathes the "lower" tank 11 in hot water and heats it. The hot water in tank 12 rises, by natural thermosyphon action and goes out through passage 4, over into the "upper" tank 13 at passage 5. (Note the flow pattern at 14, 14'.) Cold water flows out at passage 3 and over into tank 12 at passage 2, thus completing the thermosyphon loop. As time goes on, the temperatures of the water in tanks 12 and 13 substantially equalize, not using a pump or control, or valve(s). We have TWO tanks of stored, solar-heated water. Effectively we have substantially increased our stored solar-heated water capacity, at no increase in cost or complexity of the system. SIMPLICITY IS THE HEIGHT OF INVENTION!

B. Now assume much or most of the stored solar-heated water has been used up. What happens? The first backup heat-producing means, such as heating element 15 comes ON. Hot water from the top of tank 13 flows out when needed through passages 5 and 6 mixing a little with warm water coming out from passage 4 from the top of tank 12. Now assume no more hot water is used for a long period of time. Stratification keeps the hot water in the top of tank 13. It does not backflow over into tank 12 and backup-produced heat is not wasted. The heavy cold water stays at the bottoms of both tanks and the light hot water produced by backup heat rises to the top of tank 13 only. Residual solar-produced heat remaining in outer tank 11 continues to warm the cold water entering the bottom of tank 12. That "tempered" or partially-heated water rises to the top, where it can flow out and join the hot water from the top of tank 13 whenever hot water is called for at outlet 6.

Heater element 15 is located at approximately the same elevation as the top of tank 12, or higher. Hot water will rise from heater 15 but will not go down. Consequently stratification is maintained while backup heat is being supplied. Energy is not wasted to heat the bottom area of tank 13, or to heat tank 12, and backup heat is not lost out through the imperfect insulation around the tanks. As the hours and days go by, assuming no sunshine to replenish stored solar heat, the colder water will lay in the bottoms of tanks 12 and 13, stratified, with the warmer "layers" of water up toward the tops of the tanks and the colder "layers" at and adjacent to the bottoms. That phenomonon also applies to outer tank 11 so the warm water in tank 11 keeps feeding stored solar heat into tank 12. The cooled water descends to the bottom of tank 11. The warmer water rises to the top and keeps feeding heat into tank 12, which feeds heat over into tank 13 and keeps heater 15 OFF as long as possible. Even when its thermostat turns element 15 ON, it soon shuts OFF because the water was already warm and it takes less energy to heat water that is already warm. That conserves energy.

As the heat is used up from outer tank 11, and the cooler water descends to the bottom, sooner-or-later the sunshine comes back and solar heat collector(s) 9 heat the water in outer tank 11, inner tank 12 and upper tank 13. When the sunshine returns, the coldest water in the system will be at the bottom area of tanks 11 and 12. That cold water is heated more prolifically than warm water would be. More heat comes from the sun because the solar collectors operate more efficiently.

MODIFICATIONS

If heater 15 is a firebox (flame) from gas, oil, coal or such, as illustrated at 15A in FIG. 1A, or a heat-exchanger as illustrated at 15B in FIG. 1B, it should be located at approximately the same elevation as the top of tank 12, or higher, for reasons explained previously. If the heater were located at a lower elevation, it would heat the water at a higher elevation in BOTH tanks. That would waste energy, through the imperfect insulation, from the hot water and large areas near the tops of TWO tanks, instead of the top of one tank only.

A third backup heat-producing means, such as heater 15' could be installed in tank 12 at an elevation lower than heater 15. That would give a "double" heat-boost to the water to meet high-use needs and to insure that more of the water in the tanks is warm during cloudy spells. It would cause reverse thermosyphon action in tank 12, but ONLY down to the level of heater 15'. Both tanks would be assured of some water that is not cold at the beginning of a hot-water draw. At outlet 6 the water could come out a little hotter when the stored solar heat is nearly depleted because there would be warm water at the top of tank 12, plus hot water at the top of tank 13.

An EXAMPLE of how heater 15' could be useful is: Set the thermostat for heater 15' at 70° F. and the thermostat for heater 15 at 110° F. In a good solar-heating system, heater 15' would seldom come ON. Nevertheless it would serve as a "sentry" for those few instances when solar heat is inadequate to heat the water to 70°. Assume a "worst case" scenario: heater 15' would help assure that all water at an elevation higher than 15' would be pre-heated to at least 70°. Then, heater 15 would be called on only to heat the water from 70° to 110° F. Stated another way, due to stratification and the settings for the heater thermostats, minimum temperatures would be 110° at elevations above heater 15; 70° at elevations above heater 15' and; 32° to 55° at the bottoms of the tanks (cold-weather city or well-water temperatures of incoming unheated water). Thus, useful solar heat could be obtained to heat the water near the bottoms of the tanks at temperatures as low as 32° F. at times when solar heat is needed most. At such low temperatures MUCH more free heat comes from the sun because the solar heat collectors are much more efficient, and less heat comes from expensive backup heat.

Heaters 15 and 15' are illustrated as ordinary thermostatically-controlled electric immersion-type elements. But, a heat-exchanger coil, carrying hot water/liquid from a boiler or such, could be used to impart heat to the upper backup heat tank 13, as illustrated at 15B in FIG. 1B.

FIG. 1C illustrates a modification wherein cold water that comes in at 1 (only when hot water is being drawn out at 6), enters through a Tee 16 or other means to act in the manner of a jet. Therefore, flow into tank 12 at 2, and out from passage 4 in tank 12 toward passage 5 in tank 13, is encouraged. That encourages flow through the tanks and enhances the natural thermosyphon flow during periods of hot water use.

The outer tank 11 is illustrated as the type pioneered by Thomason since 1959. But, a heat-exchanger could be installed, as illustrated at 15C in FIG. 1D, to be heated by the solar heat collectors, as other inventors have done. Pump 7' circulates the fluid to be heated to the collectors and back.

The solar collector(s) 9 are illustrated as the open-flow (not inside of pipes) "trickle-flow" type Patented by Thomason, wherein the water is pumped to the top and flows down to the bottom. But, a heat collector having pipes (closed-flow) could be used.

A preferred form of the invention is described in detail hereinbefore. However, it would be possible to locate tanks 12 and 13 at the same elevation, or substantially so. Solar-heated water would flow from tank 12 to tank 13, and backup-heated water would backflow from tank 13 to tank 12 down to the level of heater element(s) 15 (15') for reasons explained hereinbefore.

FIG. 2 illustrates what to do if the water coming out at outlet 6 is not hot enough for certain needs, and also what to do if the combined heating capacity of solar-produced heat plus backup heat-means are not adequate. Please ASSUME:

A. Stored solar-heat temperatures are at 125° and the first backup heater 15 is set at 125°. Hot water coming out at 6 will be at 125°, even without backup heat. If the temperature drops below 125°, the first backup heater 15 (and possibly the third backup heater 15') will come ON to maintain 125° hot water.

B. Suppose you want 140° really HOT water. A second backup heat-producing means 20 will be set for that high temperature. So, a faucet connected to outlet 6 will deliver 125° hot water. And, water will enter heater 20 at 125° through passage 6A. Heater 20 will add heat and deliver 140° HOTTER water to passages 22, 23, 25, 26, etc.

Heater 20 may be one of the "tankless" type, also known as an "instantaneous" type, which does not have the usual standby heat losses through a tank and its insulation.

Please note that Y-shaped fittings are illustrated for takeoff points 23 and 25. That imposes a slight restriction to flow so that the fastest flow will come at 22, the first priority for fast-flowing hot water. (Other types of flow-restrictors could be used.)

C. Even hotter water, boiling hot or fast-scalding hot, will be delivered at outlets 22, 23, 25, 26 merely by turning the thermostat higher on heater 20.

D. Even if a bitter cold spell comes and the baseboard heater (radiators/convectors) 24 cannot keep the home warm with 140° hot water, the situation may be remedied quickly. The thermostat on heater 20 can be re-set for 150°, or 160°, or whatever is necessary to meet the temporary abnormal heat load. Or, for other unusual temporary very hot water needs, the thermostat on heater 20 may be turned up. It should be turned down for normal uses because that saves heat and money, by "firing" at the lowest temperature possible. Efficiencies of firing at lower temperatures are increased, less heat goes up the chimney or out into the ambient surroundings, and the apparatus itself is longer-lived.

In some installations there is no need for the extra outlet 25. In some installations there is no need for check valve 23A. When used, it prevents thermosyphon-current flow backward through heaters 24. And it also imposes a "drag" on thermosyphon flow in the forward direction (from valve 23A to pump 21). That "drag" or resistance to flow depends on factors associated with the particular valve design and construction (whether gravity-closed or spring-loaded, the spring pressure exerted on the valve, etc.) in a manner well-known to those skilled in the art.

Outlet 26 and pump 27 may be used to deliver hot water through conduit 28 to any point of need. An example is to connect conduit 28 to conduit 29 in tank 13. Then, heater 20 will supply backup heat to tank 13. That heat from heater 20 can be used to supplement the heat output of heater(s) 15 (15', 15A and/or 15B). Or, heat from heater 20 can be used instead of heater(s) 15 (15', 15A 15B). Conduit 29 in tank 13 should be at a level substantially as high as the top of tank 12. That causes hot water produced by heater 20 to remain in the top of tank 13 (stratified) and not flow down into the bottom of tank 13 or over into the lower tank 12 for reasons explained previously. The result is a limited reserve of stored hot water in the top of tank 13 and limited backup heat-loss because the entire tank is not kept hot with backup heat from heater 20.

Pump 27 is illustrated to circulate fluid in circuit 26, 27, 28, 29, 13, 5, 6 and 20. However, it would be possible to eliminate pump 27. As the parts are illustrated in FIGS. 1 and 2, natural thermosyphon currents would induce flow, to a limited extent, backward in said circuit to 6A, 6, 13, 29, 28, 27, 26, 20. Obviously heater 20 could be located and connected in a manner such that flow would be more prolific, or forward in said circuit, or both, in a simple manner which will be obvious to anyone skilled in the art.

What is claimed:

1. Multiple-tank heat storage and backup-heat combination means comprising tanks having tops and bottoms and upper areas and lower areas, a first of said tanks being a fluid heat-storage tank and first heat-producing means to impart heat to increase the temperature of fluid in said first storage tank, a second of said tanks being a backup fluid heat-storage tank and first backup heat-producing means located at a level lower than the top of said second heat-storage tank to impart heat to increase the temperature of fluid in the upper area of said second heat-storage tank, first fluid-conduit means interconnecting the upper areas of said storage tanks, second fluid-conduit means interconnecting the lower areas of said storage tanks, natural thermosyphon forces causing fluid-flow from said first tank to said second tank when the temperature is higher in said first tank than in said second tank, said storage tanks and said fluid-conduit means being arranged and interconnected to limit reverse thermosyphon-flow to that liquid which is higher than said first backup heat-producing means, a third fluid-conduit connected to the second fluid-conduit means to permit fluid-flow in to the lower area of said first tank, or the lower area of said second tank, or both, and a fourth fluid conduit connected to the first fluid-conduit means to permit fluid-flow out from the upper area of said first tank, or the upper area of said second tank, or both, said first backup heat-producing means being in said second (backup-heat) tank, said first backup heat-producing means being located at a level substantially as high as the top of said first tank.

2. The combination set out in claim 1, and second backup-heat means connected to said fourth fluid-flow conduit to further warm the fluid to a higher temperature.

3. The combination set out in claim 1, and additional backup heat-producing means, in said second tank, located at a level lower than said first backup heat-producing means.

4. The combination set out in claim 1 wherein said first backup heat-producing means is an electric heater unit.

5. The combination set out in claim 2 wherein said additional backup heat-producing means is an electric heater unit.

6. The combination set out in claim 1 wherein said first backup heat-producing means is a flame-type heater unit.

7. The combination set out in claim 2 wherein said additional backup heat-producing means is a flame-type heater unit.

8. The combination set out in claim 1 wherein said first backup heat-producing means is a heat-exchanger.

9. The combination set out in claim 3 wherein said additional backup heat-producing means is a heat-exchanger.

10. The combination set out in claim 1, and heat-use means comprising a plurality of heat-use devices and fluid-distribution means to distribute higher-temperature fluid to said heat-use device needing the highest temperature fluid.

11. The combination set out in claim 1, and heat-use means comprising a plurality of heat-use devices and fluid-distribution means to distribute fluid at higher flow-rates to said heat-use device needing the highest rate of flow.

12. The combination set out in claim 1, and second backup heat-producing means connected to said fourth fluid conduit, and a fluid circuit to conduct heated fluid from said second backup heat-producing means back to said second (backup-heat) tank.

13. Multiple-tank heat storage and backup-heat combination means comprising tanks having tops and bottoms and upper areas and lower areas, a first of said tanks being a fluid heat-storage tank and first heat-producing means to impart heat to increase the temperature of fluid in said first storage tank, a second of said tanks being a backup fluid heat-storage tank and backup heat-producing means to impart heat at a level lower than the top of said second heat-storage tank to increase the temperature of fluid in the upper area thereof, first fluid-conduit means interconnecting the upper area of said storage tanks, second fluid-conduit means interconnecting the lower areas of said storage tanks, natural thermosyphon forces causing fluid-flow from said first tank to said second tank when the temperature is higher in said first tank than in said second tank, said storage tanks and said fluid-conduit means being arranged and interconnected to limit reverse thermosyphon-flow to that fluid which is higher than said backup heat-producing means, a third fluid-conduit connected to the second fluid-conduit means to permit fluid-flow in to the lower area of said first tank, or the lower area of said second tank, or both, and a fourth fluid-conduit connected to the first fluid-conduit means to permit fluid-flow out from the upper area of said first tank, or the upper area of said second tank, or both, and a fluid circuit including said backup heat-producing means connected to the upper area of said second tank and to a mid-area of said second tank, said backup heat-producing means providing heat to said fluid circuit and thereby to the mid-area and upper area of said second tank.

14. The combination set out in claim 13, and pump means to circulate fluid in said circuit from said backup heat-producing means to said second tank and thence back to said backup heat-producing means.

15. The combination set out in claim 13, including additional backup heat-producing means, located inside of said second tank, said additional backup heat-producing means being at a level lower than the top of said first tank such that heated fluid rising from said additional backup heat-producing means tends to cross over into the upper area of said first tank and stratify in the upper area of both tanks.

16. The combination set out in claim 15 and pump means to circulate fluid in said fluid circuit from said first-mentioned backup heat-producing means to the upper area of said second tank and thence back to said first-mentioned backup heat-producing means.

17. The combination set out in claim 2, and heat-use means, and means to circulate the higher-temperature fluid to said heat-use means and back to said second backup-heat means for re-heating.

18. The combination set out in claim 12, and pump means to circulate fluid in said fluid circuit from said second backup heat-producing means to said second tank and thence back to said second backup heat-producing means.

19. The combination set out in claim 12, and a third backup heat-producing means, in said second tank, said third heat-producing means being at a level lower than the top of said first (heat-storage) tank such that heated fluid from said third backup heat-producing means tends to stratify near the tops of said first and second tanks.

20. The combination set out in claim 19, and pump means to circulate fluid in said fluid circuit from said second heat-producing means to the upper area of said second tank and thence, through said fluid circuit, back to said second heat-producing means.

* * * * *